F. L. STUART.
UNLOADING AND CONVEYING APPARATUS.
APPLICATION FILED DEC. 5, 1917.
1,271,385.
Patented July 2, 1918.
2 SHEETS—SHEET 2.
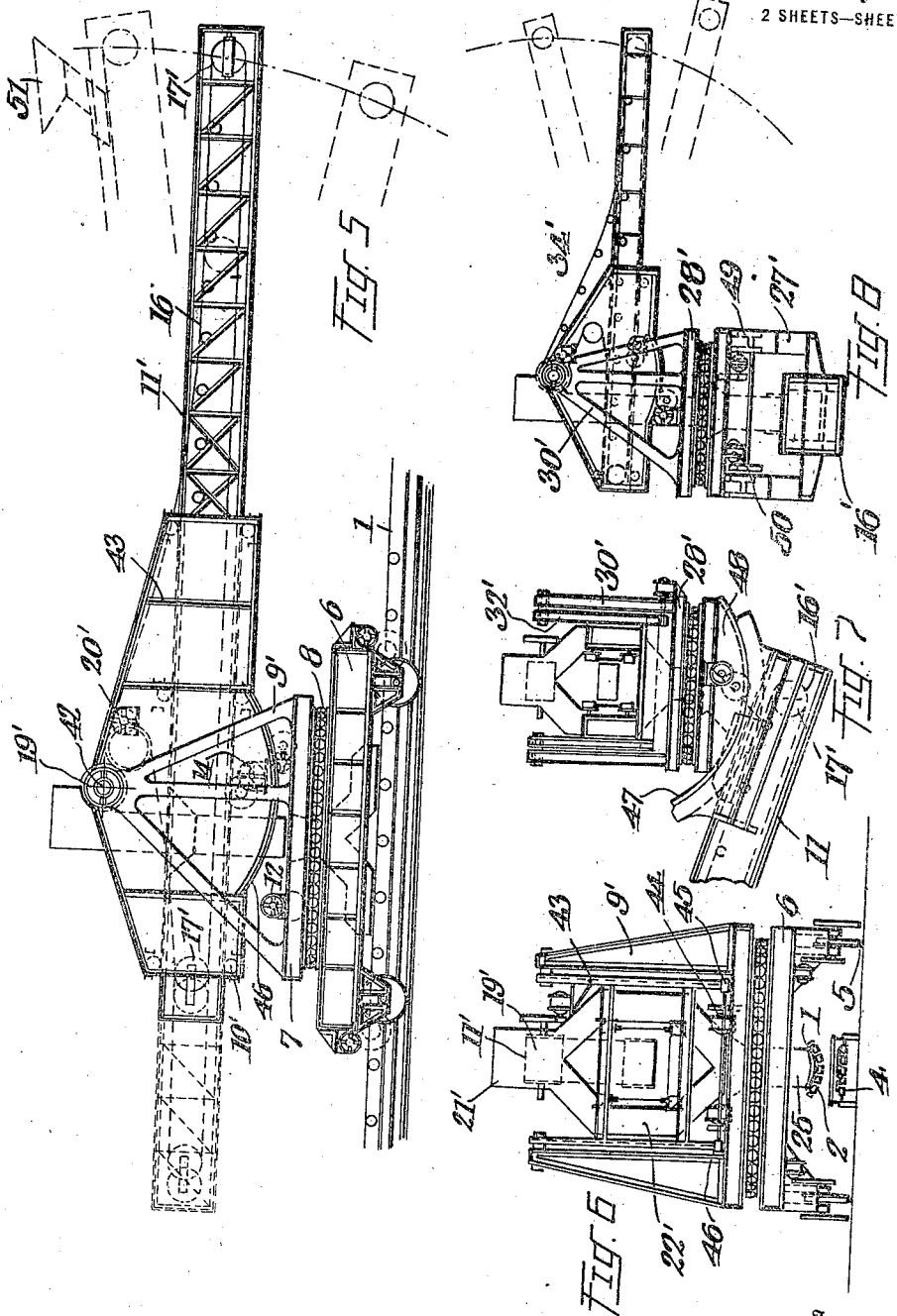
Inventor
Francis Lee Stuart.
By Baldwin Wight
his Attorneys

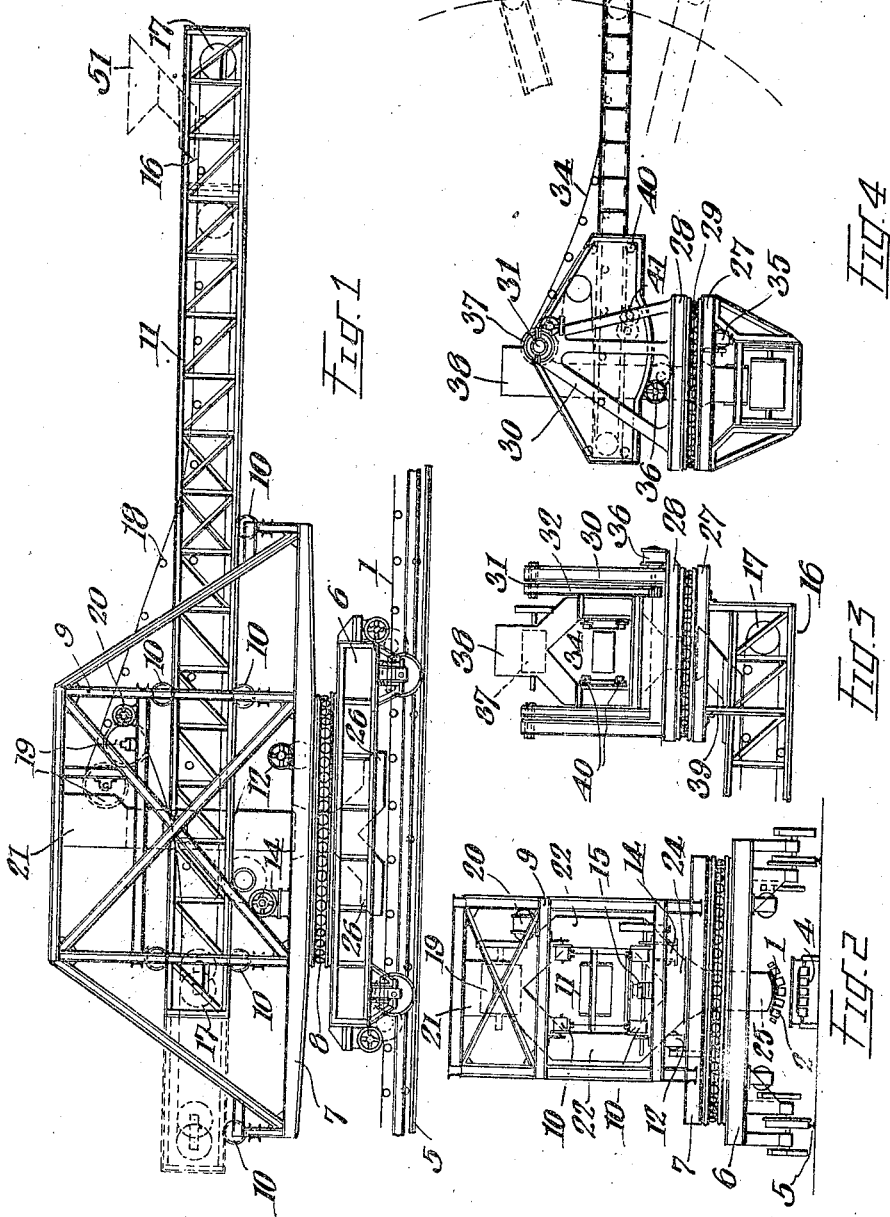

UNITED STATES PATENT OFFICE.

FRANCIS LEE STUART, OF WASHINGTON, DISTRICT OF COLUMBIA, ASSIGNOR TO INTERNATIONAL CONVEYOR CORPORATION, OF NEW YORK, N. Y.

UNLOADING AND CONVEYING APPARATUS.

1,271,385.     Specification of Letters Patent.     Patented July 2, 1918.

Application filed December 5, 1917. Serial No. 205,606.

*To all whom it may concern:*

Be it known that I, FRANCIS LEE STUART, a citizen of the United States, and a resident of the city of Washington, District of Columbia, have invented certain new and useful Improvements in Unloading and Conveying Apparatus, of which the following is a specification.

This invention relates broadly to conveying apparatus of the type disclosed in my Patent No. 1,204,203, and more specifically to apparatus of this type adapted for unloading material from any desired source, and in turn discharging the same to a main conveying belt adapted to carry the same to storage piles or the like.

The principal object of the present invention is to provide a receiving conveyer arranged to discharge material onto a main conveying belt, and adjustable with respect thereto so as to facilitate unloading.

A further object of the present invention is to provide an adjustably supported conveyer for receiving material from any desired source and discharging the same to a main conveying belt through a hopper having a fixed point of discharge irrespective of the adjustment of the receiving conveyer.

My improved apparatus for accomplishing the foregoing and other objects will be apparent from the following specification, and drawings forming a part thereof, and in which Figure 1 is a side view of a form of unloading conveyer showing the relation of the same to the main conveying belt.

Fig. 2 is an end view of the construction shown in Fig. 1.

Fig. 3 is an end view of an attachment for the unloading conveyer.

Fig. 4 is a side view of said attachment.

Fig. 5 is a side view of a modified form of apparatus.

Fig. 6 is an end view of the construction shown in Fig. 5.

Fig. 7 is an end view of an attachment for the unloading conveyer of Fig. 5.

Fig. 8 is a side view of the attachment shown in Fig. 7.

It is often desirable to unload material such as coal, ore, or the like from suitable carriers, warehouses, or other sources of supply and deliver the same to a main conveying belt capable of carrying or transferring the material either to loading apparatus or to storage devices as is common in the art. For this purpose I have illustrated a main conveying belt 1 of any well known construction, and disposed with the upper run thereof supported by troughing rollers 2, and the lower run maintained substantially parallel thereto by rolls 4. The belt is preferably disposed intermediate tracks 5 along which is adapted to travel a truck 6 for supporting the unloading conveyer in such position that it may discharge to the belt. In Fig. 1 I have illustrated a turn table 7 adjustably mounted on the truck 6 by rollers or the like 8, so that the entire turn table may be swung to any desired position independently of the travel of the truck. Mounted on the turn table is a frame work 9 carrying a plurality of anti-friction guiding rolls 10 constituting a track and guide-way for adjustably supporting the conveyer frame 11 so that the same may be moved longitudinally as indicated by dotted lines in the drawings. For producing rotatable movement of the turn table I may provide any type of motor 12, while the longitudinally adjusting means for the conveyer frame may comprise a motor 14 constituting driving means for any suitable type of rack and pinion construction 15. The conveyer frame carries a conveyer belt 16 passing around guide pulleys 17 in the frame work, and supported intermediate the guide pulleys by a series of rolls 18 which may correspond generally in construction to the rolls 2 and 4 carrying the main belt. Intermediate the guide pulleys, the conveyer 16 passes around tripper rolls 19 driven by the motor 20 for moving the conveyer. The tripper rolls 19 are located above the conveyer frame so as not to interfere with the free movement thereof, and are so positioned that the material carried by the conveyer 16 is discharged, upon operation of the device, into the hopper 21 supported by the frame work 9 and turning therewith. For producing a compact construction having the largest possible capacity, the discharge hopper 21 is divided to provide depending portions 22 extending through the frame work on opposite sides of the conveyer, and reunited below the same to constitute a discharge or outlet 24. Coöperating with the outlet is a second hopper 25 rigidly carried by the truck 6 and having oppositely extending portions 26, either of which may be used at will according to the direction of travel of the belt 1 for supplying the belt with material delivered to the hopper by the conveyer 16.

From the foregoing it will be understood that the truck 6 may be moved to any position along the trackway 5 so as to carry the unloading apparatus to the desired point. The turn table construction on the truck then permits the unloading conveyer to be swung to either side of the track, and then moved longitudinally so as to position the same at the desired loading point. If desired, the outer end of the frame 11 may carry a supplemental structure 27 constituting a support for the turn table 28 and its bearings 29. Standards 30 on the turn table constitute supports for the trunnions 31 of the pivoted frame 32 of the receiving conveyer 34. Suitable motors 35 and 36 may be provided in connection with the receiving conveyer and supporting turn table for producing the desired adjustment of the same. The receiving conveyer 34 passes around tripper rolls 37, of the general nature before referred to, causing the belt to discharge to the hopper 38 delivering through the feeding outlet 39 to the unloading conveyer 16. The hopper 38 is also preferably of split construction so that the opposite portions thereof straddle the receiving conveyer for the purpose of conserving space. Wheels 40 constitute a support permitting longitudinal adjustment of the receiving conveyer and frame when driven by the motor 41. Due to the many positions to which the receiving conveyer can be adjusted relatively to, and independently of the unloading conveyer, which in turn may be adjusted with respect to the movable supporting track, the area over which the unloading device is operative for receiving materials is almost unlimited.

Since it may be desirable under certain conditions to support the unloading conveyer so that the same may be adjusted vertically with respect to its supporting truck, as well as being adjustable horizontally and rotatably, I have illustrated in Fig. 5 a modified type of mounting for the unloading conveyer. This mounting preferably comprises standards 9' constituting bearings for the trunnions 42 of the pivotally carried supporting frame 43. Longitudinally adjustable on the roller track-way 10' by the motor 14, and movable to different vertical positions by the motors 44, is a conveyer frame 11'. The last mentioned motors are preferably designed for driving the pinions 45 meshing with the segmental racks 46. The unloading conveyer 16' carried by the frame 11' passes around the guide wheels 17' in the frame to the tripper rolls 19' driven by the motor 20' and causing the belt to discharge to the hopper 21' constructed with the straddling portions 22' delivering to the coöperating hopper 25 as before described in connection with the apparatus illustrated in Figs. 1 and 2.

Where an unloading conveyer is employed which may be moved to different inclined or vertical positions about a fixed axis, it is necessary to provide a mounting for the receiving conveyer, where the same is employed, which will compensate for the angle of inclination given to the unloading conveyer. In Figs. 7 and 8 is illustrated a construction for accomplishing this end, and comprising a supplemental frame 27' for the base 48 of the turn table 28'. The base 48 may be provided with flanged wheels 49 operated by a motor 50 for moving the same along the curved track-way 47 so that the base and the turn table carried thereby may at all times be maintained in vertical operative position. The standards 30' for the frame 32' of the receiving conveyer 34' are identical in construction with that disclosed in Fig. 4 which has heretofore been described in detail.

With the modified form of apparatus just described, it is possible, by simply changing the inclination of the unloading conveyer, to make the device useful for receiving material from sources of supply located at different levels. It will be apparent that throughout the various forms described, the hoppers, constituting the receiving and discharging means for transferring material from one belt to another, are fixed so that at all times they are in position to deposit the material accurately upon the belts to which they discharge.

In some cases the receiving conveyer may be omitted entirely and a hopper 51 substituted. These hoppers, when employed, are so constructed that they are adapted to receive material directly from a steam shovel or the like, thereby making the apparatus useful in connection with excavating or elevating appliances of different types.

Realizing that it is possible to vary the structural embodiment of the different forms of apparatus employed, it is intended that the drawings shall be considered as illustrative of the preferred embodiment of my invention rather than as limiting the same.

In my application for patent Serial No. 201,798, filed Nov. 13, 1917, I have shown a conveying system comprising a main conveyer belt; a track parallel therewith, a truck supported on said track, motor for driving said truck; a turntable carried by the truck and provided with a hopper delivering to said main conveyer belt; and a boom conveyer supported at its inner end by said turn-table delivering through the hopper to the main conveyer belt and which is pivotally mounted at its inner end to move about a horizontal axis whereby the outer end of the boom conveyer may be elevated and swung from one side of the track to the other to gather material on either side thereof. I therefore make no claim in the present case to such subject matter.

What I claim is—

1. The combination with a main conveying belt, of a truck adjustable with respect thereto, a turn table mounted on the truck, a hopper carried thereby for delivering material to the belt, and a longitudinally and angularly adjustable unloading conveyer for delivering material to said hopper.

2. An unloading and conveying apparatus, comprising a main conveyer belt, a track parallel therewith, a truck supported on said track, a turn-table on said truck, a frame on the turn-table movable about a vertical axis independently of any movement given to the truck, a hopper mounted on said frame and turning therewith and which delivers centrally through the turn-table, a chute fixed to the truck into which the hopper delivers, and an unloading conveyer carried by said frame turning therewith and delivering at all times to said hopper.

3. An unloading and conveying apparatus, comprising a main conveyer belt, a track parallel therewith, a truck supported on said track, a turn-table on said truck, a frame on the turn-table, a hopper mounted in the frame and delivering centrally through the turn-table to the conveyer belt, a horizontally arranged unloading conveyer carried by said frame and delivering at all times to said hopper, a receiving conveyer mounted on the outer end of the unloading conveyer and turning therewith about the axis of the turn-table, and means on the outer end of the unloading conveyer for turning said receiving conveyer about a vertical axis relatively to the unloading conveyer.

4. An apparatus of the class described, comprising a main conveying belt, a hopper discharging material thereto, an unloading conveyer longitudinally and angularly adjustable with respect to said hopper for supplying material thereto, and a receiving conveyer longitudinally and angularly adjustable with respect to said unloading conveyer for delivering material to said conveyer.

5. The combination with a main conveying belt, of a truck adjustable longitudinally thereof, a turn table carried by said truck, a supporting frame on the turn table, a hopper in said frame, an unloading conveyer adjustably mounted in said frame, a hopper on the receiving end of said unloading conveyer, and means for causing the unloading conveyer to discharge material carried thereby to said first-mentioned hopper.

6. In an unloading and conveying apparatus, a discharging hopper, an adjustable unloading conveyer discharging material to said hopper, and a receiving conveyer longitudinally, vertically and angularly adjustable with respect to said unloading conveyer and delivering material thereto.

7. An apparatus of the class described, comprising a main conveying belt, a hopper discharging material thereto, an unloading conveyer longitudinally and angularly adjustable with respect to said hopper for supplying materials thereto, and a receiving conveyer coöperating therewith, means for maintaining said receiving conveyer in horizontal position irrespective of the inclination of the unloading conveyer, said receiving conveyer being adjustable longitudinally, vertically and angularly with respect to said unloading conveyer for delivering materials to said conveyer.

8. The combination with a main conveying belt, of a truck adjustable with respect thereto, a turntable mounted on the truck, a hopper carried thereby for delivering material to the belt, and a longitudinally, vertically and angularly adjustable unloading conveyer for delivering material to said hopper.

9. An apparatus of the class described, comprising a main conveying belt, a hopper discharging material thereto, an unloading conveyer longitudinally and angularly adjustable with respect to said hopper for supplying material thereto, and a receiving conveyer longitudinally, vertically and angularly adjustable with respect to said unloading conveyer for delivering material to said conveyer.

10. The combination with a main conveying belt, of a truck adjustable longitudinally thereof, a turntable carried by said truck, a supporting frame on the turntable, a hopper in said frame, an unloading conveyer longitudinally and vertically adjustable in said frame, a hopper on the receiving end of said unloading conveyer, and means for causing the unloading conveyer to discharge material carried thereby to said first-mentioned hopper.

11. An apparatus of the class described, comprising a main conveying belt, a hopper discharging material thereto, an unloading conveyer longitudinally, vertically and angularly adjustable with respect to said hopper for supplying materials thereto, and a receiving conveyer coöperating therewith, means for maintaining said receiving conveyer in horizontal position irrespective of the inclination of the unloading conveyer, said receiving conveyer being adjustable longitudinally, vertically and angularly with respect to said unloading conveyer for delivering materials to said conveyer.

12. The combination with a main conveyer, of a truck adjustable longitudinally thereof, a turn table mounted on said truck, a frame work carried by said turn table, a hopper divided to extend on opposite sides of said frame, and laterally adjustable means intermediate the parts of said hopper for delivering material thereto..

13. The combination with a main conveyer of a truck adjustable longitudinally thereof, a turntable mounted on said truck, a frame work carried by said turn table, a hopper divided to extend on opposite sides of said frame, and laterally and angularly adjustable means intermediate the parts of said hopper for delivering material thereto.

In testimony whereof, I have hereunto subscribed my name.

FRANCIS LEE STUART.